Dec. 22, 1959    R. C. LE BRON    2,918,196
CANNED FOODS DISPENSING CABINET
Filed April 8, 1957    2 Sheets-Sheet 1
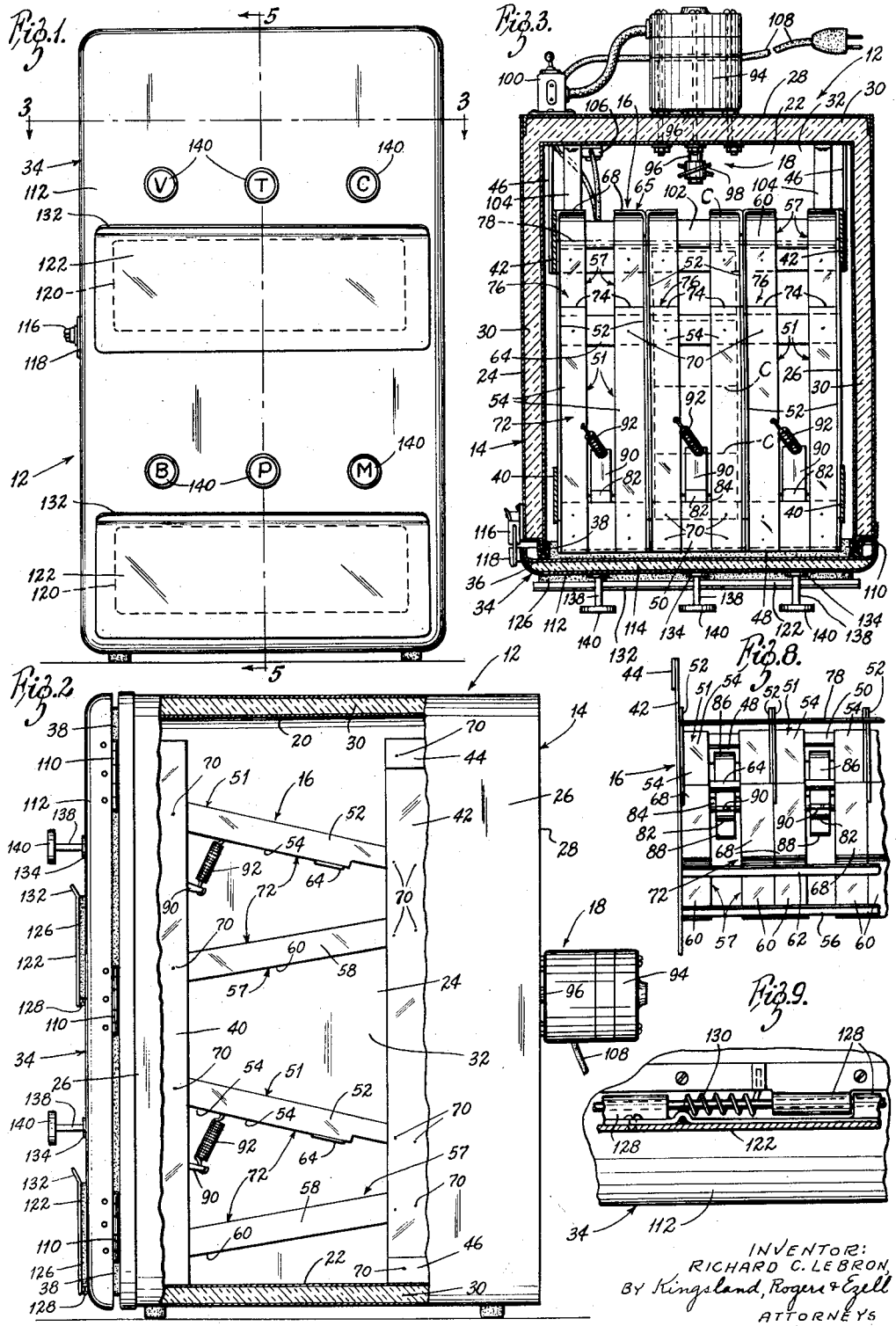
INVENTOR:
RICHARD C. LE BRON,
BY Kingsland, Rogers & Ezell
ATTORNEYS Dec. 22, 1959   R. C. LE BRON   2,918,196
CANNED FOODS DISPENSING CABINET
Filed April 8, 1957   2 Sheets-Sheet 2
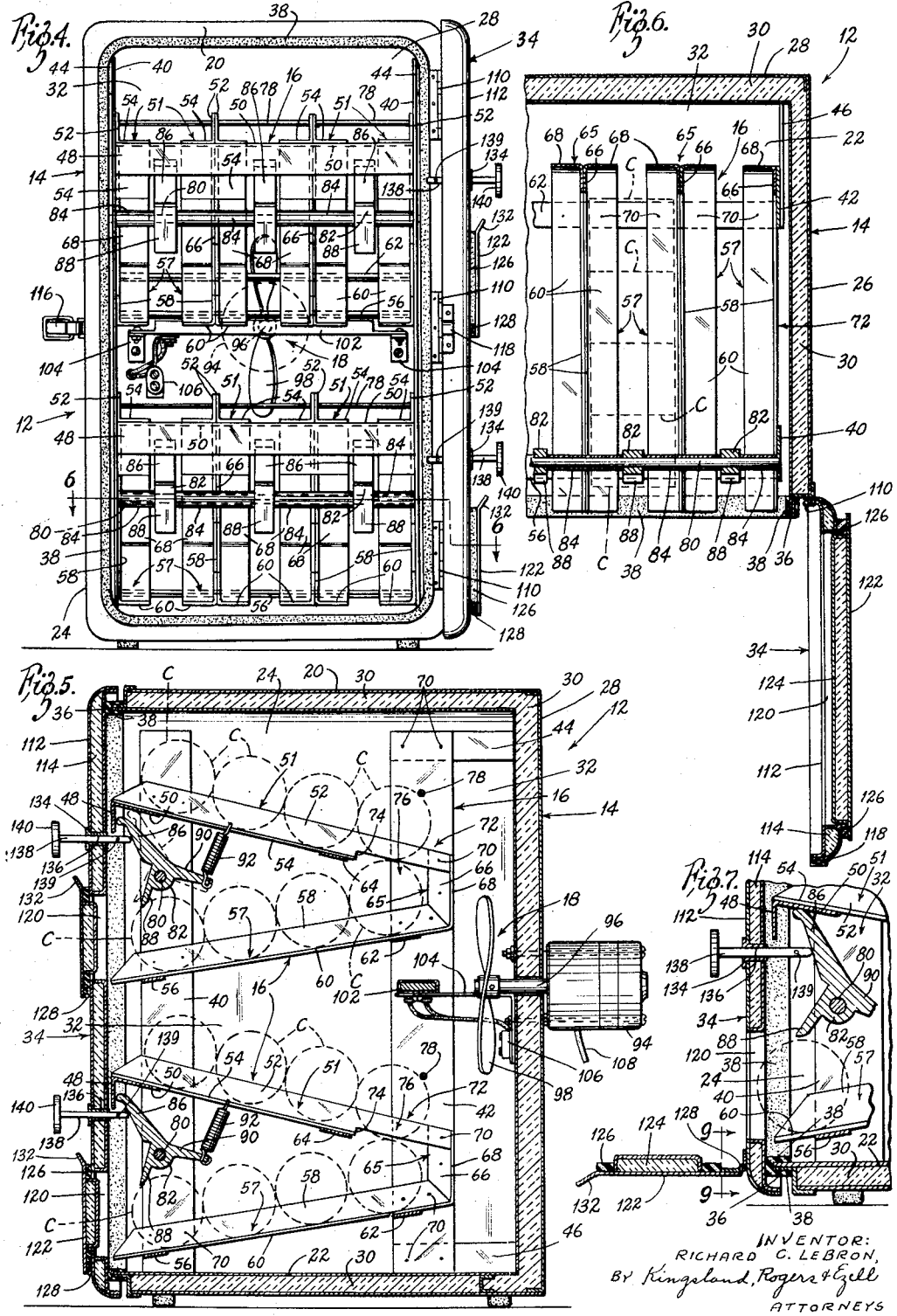
INVENTOR:
RICHARD C. LEBRON,
BY Kingsland, Rogers & Ezell
ATTORNEYS United States Patent Office 2,918,196
Patented Dec. 22, 1959

2,918,196

CANNED FOODS DISPENSING CABINET

Richard C. LeBron, Omaha, Nebr., assignor to LeBron, Inc., Omaha, Nebr., a corporation of Nebraska Application April 8, 1957, Serial No. 651,538

3 Claims. (Cl. 221—124)

The present invention relates generally to equipment for use primarily in restaurants, cafeterias, and similar establishments where food is prepared and served on a commercial basis, although not limited to such use, as will appear.

More particularly, the present invention relates to a novel and improved cabinet designed for the heating and quick serving of canned foods, primarily though not exclusively, canned foods in the soup category.

Customarily, public eating establishments feature one or two varieties of soup on their daily menu. Frequently, however, the particular soups listed on the menu may not appeal to some patrons, and it is the primary object of the present invention to provide a dispensing cabinet making available for immediate serving a variety of hot soups over and above those specifically listed on such menus.

To this end, the invention provides an insulated cabinet wherein cans of soup may be heated to an appropriate temperature condition for the palatable consumption of the contents thereof, and may be so maintained indefinitely until dispensed, as will appear.

Broadly, the insulated cabinet of the invention includes a top and a bottom wall, a pair of side walls and a rear end wall, said walls combining to define an interior chamber normally closed at the front of the cabinet by a swingably mounted insulated door assembly. Means are provided whereby to normally seal said chamber against fortuitous entry thereinto of ambient air. An unattached unitary structure, including can-supporting and dispensing means, is disposed within said chamber, being supported therein by the bottom wall of the cabinet.

Means in the form of an electrical heater unit suspended in said chamber is adapted to generate heat therein, and a motor driven fan is adapted to circulate the generated heat about the canned soups until they attain a temperature of approximately 155°.

A thermostat device is installed in the chamber for controlling the heating assembly so as to maintain the 155° temperature constant approximately, without however permitting a rise in temperature above that indicated. In other words, inasmuch as the cans would be manually removed from the cabinet for opening and serving the contents thereof, as will appear, a higher temperature would tend to produce a difficult handling problem, as is understood.

The exemplary embodiment of the invention herein disclosed, is designed to have available six varieties of hot soup for immediate dispensing and serving. Accordingly, six operating buttons are provided, each visibly indicating the particular variety of soup that will be automatically dispensed in response to pressing the button selected. These buttons are slidably and removably mounted in the insulated door assembly.

Means in the form of spring biased pivotally mounted levers are provided to control can delivery, so that only one can will be released when a selected button is pressed.

The door assembly has a pair of openings formed therein, each of these openings being normally closed by a spring-biased cover member. A can of heated soup released in consequence of pressing one of the buttons, may be taken from the cabinet by opening the appropriate cover member with one hand, and grasping said can with the other.

Loading the cabinet initially with cans, and replenishing the supply therein as needed, is a simple operation performed with the door assembly swung to open position.

The invention is illustrated on two sheets of drawings that accompany this specification, and a more comprehensive understanding of its features and advantages may be had from the detailed description to follow with reference to said drawings, wherein:

Figure 1 is a front elevational view of a canned foods dispensing cabinet constructed in accordance with the concepts of the present invention;

Figure 2 is a right side elevational view thereof with a portion of the side wall broken away;

Figure 3 is a sectional top plan view taken on the line 3—3 of Figure 1;

Figure 4 is a front elevational view of the cabinet with the door unlatched and swung to open position;

Figure 5 is a vertical sectional view taken on the line 5—5 of Figure 1;

Figure 6 is a fragmentary sectional plan view taken on the line 6—6 of Figure 4;

Figure 7 is a slightly enlarged reproduction of the lower left hand portion of Figure 5 showing some movable elements in an alternate position;

Figure 8 is a fragmentary rear elevational view of the can feeding unit of the invention; and Figure 9 is an enlarged fragmentary view partly in section, taken on the line 9—9 of Figure 7.

In Figures 1 through 6, the dispensing cabinet comprising the present invention is designated as a whole by the numeral 12. It includes an insulated cabinet proper that is generally designated 14, a can feeding unit generally designated 16, and a temperature control assembly generally designated 18.

The cabinet 14 includes a top wall 20, a bottom wall 22, a left side wall 24, a right side wall 26, and a rear wall 28. As clearly demonstrated in the drawings, all of the walls aforesaid are formed of spaced parallel panels that are welded or otherwise rigidly secured together, with insulating material 30 disposed therebetween.

These walls define a rectangular heat chamber 32 within the cabinet, said chamber being open at the front, but normally closed by means of a hingedly mounted door assembly generally designated 34. Surrounding the front opening of the chamber 32, is a substantially rectangular rim portion 36 projecting forwardly from the top, bottom, and side walls of the cabinet 14. As best seen in Figures 4, 5, and 7, an endless band 38 of rubber or analogous material, and having a channel-shaped cross-sectional contour, is fitted over said rim portion as best seen in Figures 4 and 7.

The can feeding unit 16 is supported within the chamber 32 from the bottom wall 22 of the cabinet. Said unit includes: a substantially rectangular framework, preferably but not necessarily of sheet metal with the components thereof being spot-welded together to provide rigidity; a plurality of transversely spaced feed control levers pivotally mounted on vertically spaced cross rods supported by the framework at the front; tension coil springs associated with the levers; and a pair of vertically spaced can stop and deflecting bars extending transversely and supported by the framework at the rear end thereof.

The framework aforesaid comprises: a pair of horizontally spaced front supports 40; a pair of similar rear supports 42; a plate 44 projecting rearwardly from the upper end of each rear support 42; a similar plate 46 projecting rearwardly from the lower end of each rear support 42; a pair of vertically spaced angle members 48 connecting the front supports 40 and projecting forwardly therefrom as shown, the upper leg segments 50 of said angle members being rearwardly downwardly inclined; a plurality of rearwardly downwardly inclined tracks 51 at an upper level and a plurality of similar tracks at a lower level, said tracks being of right-angular cross-section to include perpendicularly disposed leg segments 52 normal to laterally extending leg segments 54; a pair of vertically spaced transverse strips 56 connecting the front supports 40, said strips being rearwardly upwardly inclined as shown; a plurality of rearwardly upwardly inclined tracks 57 at an upper level and a plurality of similar tracks at a lower level, said tracks being of right-angular cross-section to include perpendicularly disposed leg segments 58 normal to laterally extending leg segments 60; a pair of vertically spaced transverse strips 62 connecting the rear supports 42, said strips beng rearwardly upwardly inclined as shown; a pair of vertically spaced transverse strips 64 connecting the leg segments 54 of said rearwardly downwardly inclined tracks; and a plurality of vertically disposed tracks 65 each connecting one of said downwardly and one of said upwardly inclined tracks, said vertical tracks being of right-angular cross-section to include horizontally disposed leg segments 66 normal to laterally extending leg segments 68. It is noted that the plates 44 and 46 serve to properly position the unit 16, as should be evident.

All of the framework components enumerated in the preceding paragraph are spot-welded to contiguous components, as suggested at 70 in some views of the drawings. It is to be understood however, that other appropriate means may be employed to integrate said components into a unitary framework that may be slid into position within the chamber 32 prior to the application of the endless band 38.

As should be evident from an inspection of the drawings, the described tracks 51, 57, and 65 provide substantially V-shaped runways or delivery chutes 72 for food containers or cans suggested in broken lines and designated C. In the exemplary embodiment of the invention illustrated, six delivery chutes 72 are incorporated in the unit 16, it being understood that by increasing the height or width of said cabinet and unit 16, additional chutes could be added. Each chute 72 as illustrated, is comprised of a transversely spaced pair of said tracks, the cans C traveling along the laterally extending leg segments 54 and 60, and being maintained in alignment by means of the perpendicularly disposed leg segments 52 and 58, and the horizontally disposed leg segments 66.

As best seen in Figures 2 and 5, the leg segments 54 of each track 51 are cut away at 74, thus forming passages designated 76 through which the cans C may descend by gravity onto the tracks 57. A pair of vertically spaced bars 78 connect the rear supports 42 of the unit 16, and serve to momentarily arrest the rearwardly rolling movements of the cans and deflect them downwardly through the passages 76, as should be manifest.

A pair of vertically spaced cross rods 80 extend between and have their ends supported in the front supports 40. Individual can feed control levers 82 are provided for each of the chutes 72, said levers being pivotally mounted on the cross rods 80, and being maintained in appropriate spaced relation relatively to one another and the supports 40 by means of sleeves 84, as seen to best advantage in Figures 4 and 6.

Each control lever 82 includes an angularly upwardly projecting actuator arm 86, a depending can stop arm 88, and a rearwardly projecting finger 90. Coil tension springs 92 are each anchored at one end to one of the fingers 90, and at the other end to one of the thereabove leg segments 54 of the tracks 51. In consequence of this arrangement, the springs 92 continually bias the levers 82 to the postion thereof shown in Figure 5, where it can be observed that each actuator arm 86 normally abuts an angle bar 48, and each can stop arm 88 is disposed in the path of the leading can or container C supported on the lower track 57 of each chute. (It is noted that in the interest of clarity, illustration of the springs 92 has been omitted in Figures 4 and 8 of the drawings.)

The temperature control assembly 18 includes: a motor 94 suitably mounted on the cabinet rear wall 28, and having its shaft 96 extending through said wall to project into the chamber 32; a fan 98 rigidly secured to the inner end of said shaft; a switch 100 also suitably mounted on the wall 28 exteriorly of the cabinet; an electrical heating unit 102 supported within the chamber 32 in front of said fan by means of angle brackets 104; a thermostat 106 also mounted in chamber 32; a cord 108 for connecting the assembly with a source of electrical energy; and wiring interconnecting said motor, said switch, said heating unit and said thermostat. Mounting the motor 94 exteriorly of the cabinet prevents overheating thereof, and facilitates its lubrication when required.

The door assembly 34 is swingably supported from the cabinet by hinges 110, the body 112 of the door being constructed of spaced parallel panels preferably having insulating material 114 disposed therebetween as shown. A suitable latch device 116 is mounted on the left side wall 24 for cooperation with a keeper 118 secured to the unhinged edge portion of the door body 112, whereby the latter may be releasably locked in closed position, as is understood. In the closed position of the swingable assembly 34, the inner surface of the door body bears against the adjacent face portion of the band 38, thus slightly compressing said band and hermetically sealing the chamber 32 against atmosphere.

A pair of rectangular vertically spaced delivery openings 120 is provided in the door body, each of said openings being slightly wider than the combined width of three chutes 72. A cover member 122 is provided for each opening 120. As illustrated in Figure 6, and on a slightly enlarged scale in Figure 7, each cover member 122 is formed of spaced parallel panels preferably having insulating material 124 disposed therebetween, and is provided with a rectangular band 126 of rubber or like material on its inner face.

With attention directed also to Figure 9, each cover member 122 is swingably supported along its bottom edge by means of a piano hinge 128 secured thereto and to the adjacent portion of the door body 112. Portions of the hinges 128 are cut out at spaced intervals to accommodate torsion springs 130 that are interposed about the hinge pin, each with one end thereof anchored to the door body 112, and the other end thereof anchored to the cover member 122 as illustrated.

In consequence of this arrangement, each cover member 122 is constantly biased to a closed position wherein the band 126 surrounds an opening 120, and is compressed into sealing engagement with the adjacent surfaces of the door body 112. To facilitate manual swinging of the cover members to open position against the biasing forces of the torsion springs 130, the free top edges 132 thereof are preferably bent forwardly as illustrated.

The door assembly 34 further includes flanged bushings 134 that are pressfitted through and welded to the door body. The inner periphery 136 of each bushing 134 is square in contour, and slidably receives and supports the square shank portion 138 of a push button 140. The bushings 134 are located in determined correspondence with the levers 82, so that in the closed position of the door assembly, the rounded inner end of each shank 138 will be directed against one of the lever actuator arms 86, as should be apparent. Preferably, each shank 138 is provided with a removable pin 139 that projects therefrom slightly, thus obviating fortuitous displacement and loss of the push buttons.

Although it is believed that the foregoing description augmented by an inspection of the drawings should be adequate for a complete understanding of the invention, a brief further explanation will be given.

*Operation in use*

As previously noted, although the present invention may also be employed to dispense hot canned foods such as creamed corn, peas, spinach, and so on, it is primarily designed for the purpose of having a variety of hot soups available for dispensing and immediate serving.

Wherefore, assuming that the illustrated cabinet 12 be devoid of canned goods, and it were decided to load said cabinet with six varieties of canned soup, and assuming further that vegetable, tomato, chicken, bean, pea, and mushroom soup had been selected, the buttons 140 would first be labeled accordingly, it being remembered that the shanks 138 of these buttons are slidably supported in the bushings 134, and may be removed if necessary after extracting the pin 139.

In Figure 1, the button labels or markings are indicated by capital letters, but in actual practice, full spelling of the soup varieties is contemplated so as to minimize error. In other words, the buttons exhibiting the letters "V" and "T" would in actual practice exhibit the words "Vegetable" and "Tomato" respectively, and so on.

With the door assembly now unlatched and swung to open position as in Figures 4 and 6, a succession of cans C containing the kind of soup indicated by each button would be deposited on the upper track 51 of the appropriate chute 72. As the cans roll rearwardly down track 51, each would in turn encounter one of the stop bars 78 and be deflected downwardly onto the track 57 therebelow, the initially entered can C being arrested by the arm 88 of the spring biased feed control lever 82.

Assuming now that all of the chutes 72 had been loaded to capacity as suggested in Figure 5, the door assembly 34 would be swung to closed position and latched, this action serving also to align the shanks 138 of the buttons 140 with the appropriate control lever arms 86, as should be manifest.

Thereupon the cord 108 would be plugged into a socket, and the switch 100 would be turned on. As a result, the heating unit 102 would be energized, and the fan 98 would rotate, thus circulating the heat emanating from said heating unit about the cans in the insulated and sealed chamber 32. The thermostat 106 is a control device designed to maintain a constant temperature of approximately 155° within the chamber 32, so that after the heating assembly 18 had been in operation for a time elapse of approximately one and one-quarter hours, the canned soups in the cabinet would be ready for dispensing and immediate serving.

Thus, assuming now that a serving of hot tomato soup were called for, the cover member 122 beneath the button 140 labeled "T" would be lowered by grasping the edge 132 thereof and swinging said cover outwardly. Simultaneously, said button would be pressed inwardly until the leg segment 50, serving as an abutment for the actuator arms 86, would arrest further inward movement of the button, which would then be released and returned to its normal position under the influence of the tension spring 92.

In the interim, however, the can stop arm 88 will have been raised momentarily, whereas the finger 90 will have been simultaneously lowered. As a result of this lever movement, the theretofore leading captive can C will have been released to roll onto the lowered cover member 122 for removal, whereas the next succeeding can and those following will have been momentarily detained, as should be clear from an inspection of Figure 5.

Instantaneously upon cessation of pressure application to said button, the return of the lever 82 to normal status under the influence of spring 92 will have raised the finger 90 and lowered the stop arm 88, thus enabling the momentarily detained can aforesaid and those following to roll forwardly a slight distance, or until the periphery of what has now become the leading can C is arrested by the stop arm 88.

As previously indicated, the cover members revert to normal or closed status automatically. Assuming that during a dispensing operation sufficient heat had escaped via an opening 120 to reduce the temperature in chamber 32, the thermostat 106 would reenergize the heating assembly until the 155° temperature condition had been restored. Obviously, after removal of a can C, said can would be opened and its contents would then be poured into a vessel for serving. A combined can dispensing, can opening, and soup pouring operation may be performed in less than twenty seconds, and it has been found by tests that if the soups are not poured into cold vessels, heat losses will not exceed 15°.

Although as hereinbefore stated, the invention is designed primarily for installation in restaurants and other food preparing and serving establishments, its use is not at all thus restricted. In other words, cabinets such as the disclosed cabinet 12, could very well be set up, for example, at a factory lunch room, at a tavern, or at a drug store, and so on.

The foregoing description and accompanying drawings are believed to present a comprehensive disclosure of this invention. It is to be understood however, that the invention is not limited to the precise structural and other details illustrated and described, but contemplates any modifications or equivalents that may fall within the scope of the appended claims.

What is claimed is:

1. A dispenser for hot canned soups comprising in combination: an insulated cabinet defining therein a substantially rectangular chamber open at the front, a swingably mounted latchable insulated door normally sealing said chamber against atmosphere; a can supporting and feeding unit freely disposed within the chamber, said unit including a plurality of substantially V-shaped chutes each provided with means for maintaining a plurality of cans in alignment, and means enabling cans to descend by gravity from the upper branch to the lower branch of the chute; a heating unit in the chamber controlled by a thermostat to maintain an approximate determined temperature within said chamber, a pivotally supported spring biased can feed lever associated with each chute, said lever controlling the movements of cans supported on the chute; a pair of vertically spaced transverse openings in the door each disposed adjacent the front end of the lower branches of a plurality of chutes when said door is in closed position; a hingedly supported cover member for each opening normally biased to closed position over the opening by torsion spring means; a push button for each chute, each button having a shank portion slidable in a bushing mounted in the door body opposite one of said levers, whereby pressure applied to the button will cause the shank thereof to actuate the lever in a manner to release a single can to removal via one of said openings with the cover member therefor swung to open position; and means obviating accidental outward removal of said buttons.

2. A dispenser for hot canned soups as in claim 1, wherein the can supporting and feeding unit disposed within the chamber rests on the bottom wall of the cabinet, and further includes means in the form of vertically spaced transverse bars serving to momentarily arrest rearwardly rolling movements of cans on the upper branches immediately prior to their descent by gravity onto the lower branches of said chutes.

3. An insulated canned foods dispensing cabinet encompassing a normally sealed chamber; and means for supporting a plurality of canned foods within said chamber comprising a pair of horizontally spaced front supports, a pair of similar rear supports, a plate projecting rearwardly from the upper end of each rear support, a similar plate projecting rearwardly from the lower end of each rear support, a pair of vertically spaced angle members connecting the front supports and projecting forwardly therefrom, the upper leg segments of the angle members being rearwardly downwardly inclined, a plurality of rearwardly downwardly inclined tracks at an upper level and a plurality of similar tracks at a lower level, said tracks being of right-angular cross section to include perpendicularly disposed leg segments normal to laterally extending leg segments, a pair of vertically spaced transverse strips connecting the front supports, said strips being rearwardly upwardly inclined, a plurality of rearwardly upwardly inclined tracks at an upper level and a plurality of similar tracks at a lower level, said tracks being of right-angular cross section to include perpendicularly disposed leg segments normal to laterally extending segments, a pair of vertically spaced transverse strips connecting the rear supports, said strips being rearwardly upwardly inclined, a pair of vertically spaced transverse strips connecting the laterally extending leg segments of said rearwardly downwardly inclined tracks, and a plurality of vertically disposed tracks each connecting one of said downwardly and one of said upwardly inclined tracks, said vertical tracks being of right-angular cross section, the rear ends of said laterally extending leg segments of the rearwardly downwardly inclined tracks being cut away to form passages through which cans may descend by gravity from the downwardly to the upwardly inclined tracks, means for first heating said foods in the cans to a determined temperature and for thereafter maintaining them at such temperature; and manually operable means to effect the release and delivery of selected heated cans for opening and immediate serving of their contents.

References Cited in the file of this patent
UNITED STATES PATENTS

| | | |
|---|---|---|
| 514,948 | Luster | Feb. 20, 1894 |
| 618,712 | McCall | Jan. 31, 1899 |
| 862,923 | Linsley | Aug. 13, 1907 |
| 951,323 | Mathewson | Mar. 8, 1910 |
| 1,165,958 | Freas | Dec. 28, 1915 |
| 1,889,406 | Goldschmidt | Nov. 29, 1932 |
| 2,150,469 | Tozer et al. | Mar. 14, 1939 |
| 2,164,265 | Wilson | June 27, 1939 |
| 2,371,845 | Robison | Mar. 20, 1945 |
| 2,408,331 | Mills | Sept. 24, 1946 |
| 2,576,874 | Acton | Nov. 27, 1951 |
| 2,765,005 | Wellekens | Oct. 2, 1956 |

FOREIGN PATENTS

| | | |
|---|---|---|
| 347,253 | Great Britain | Apr. 21, 1931 |